Oct. 25, 1960   H. W. MASON ET AL   2,957,675
DAMPING MEANS
Filed May 7, 1956
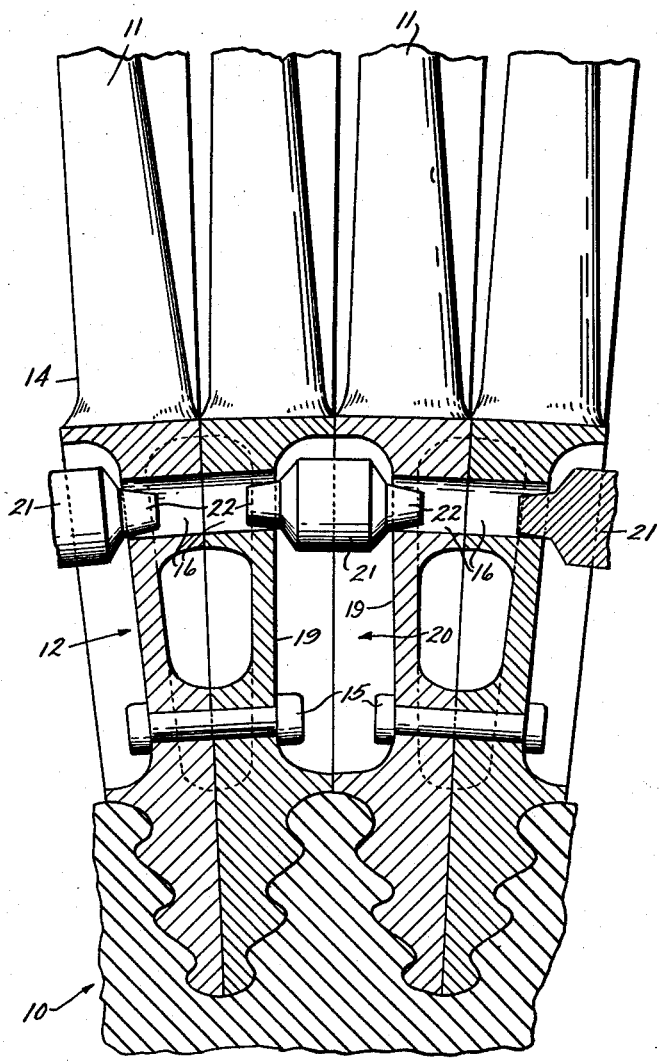
INVENTORS.
HARVEY W. MASON
JOSEPH S. ALFORD
BY
John F. Cullen
THEIR ATTORNEY

United States Patent Office 2,957,675
Patented Oct. 25, 1960

2,957,675
DAMPING MEANS

Harvey Waldo Mason, Sharonville, and Joseph Savage Alford, Cincinnati, Ohio, assignors to General Electric Company, a corporation of New York Filed May 7, 1956, Ser. No. 583,290

2 Claims. (Cl. 253—77)

This invention relates to a vibration dampener and, more particularly, to an arrangement for damping the vibration of turbine or compressor buckets or blades or the like, and will be described for turbine application although the invention is not limited thereto.

The blades or buckets of a turbine are subject to vibrations during operation of the turbine. These vibrations produce stresses that cause failure of the buckets or blades. The present invention provides an arrangement for reducing these vibratory stresses by dissipating the vibratory energy.

An object of this invention is to provide an improved arrangement for reducing the vibration of turbine buckets.

Other objects of this invention will be readily perceived from the following description.

Briefly described, this invention relates to the combination of a rotor having pairs of buckets mounted thereon. Each of the pairs of buckets has a shank portion and a blade portion. The vibrations of the buckets are dampened by movable means supported by the shank portions of the pairs of buckets.

Our invention will be better understood from the following description taken in connection with the accompanying drawing and its scope will be pointed out in the appended claims.

The single figure is a sectional view partly in elevation of the preferred embodiment of the present invention.

Referring to the drawing, there is shown a rotor 10 of a turbine having a plurality of buckets 11 mounted thereon. Each of the buckets 11 has a shank portion indicated generally at 12 and a blade portion 14. Dual buckets are formed by securing or connecting adjacent buckets 11 together by suitable connecting means such as a rivet 15. The lowermost parts of the shank portions 12 of the buckets 11 of a dual bucket cooperate together to form a serrated root that is disposed in a corresponding serrated recess in the rotor 10 for securing the dual buckets to the rotor.

Each of the buckets 11 has a lateral passage 16, which may be of circular cross section and may extend through its shank portion 12. The passages of each pair of buckets 11 of a dual bucket are in substantial alignment with the passages of the next adjacent pair and it will be understood that the passages 16 are substantially normal to the radius emanating from the axis of the rotor.

The shank portion 12 of each of the buckets 11 has a recess 19 in the portion adjacent the bucket 11 of the next adjacent dual bucket 11 so that the recesses 19 of two adjacent dual buckets cooperate to form a pocket or chamber indicated generally at 20 therebetween. The damping means is disposed in the pocket 20 and supported by the adjacent shank portions 12. The damping means includes a member 21 of substantial mass and preferably of cylindrical shape. The member 21 is supported by a trunnion 22 extending from each side thereof. The trunnions 22, which are preferably of cylindrical shape, are disposed within the passages 16 of the adjacent buckets 11 of the two adjacent dual buckets. It will be noted that the trunnions 22 have a smaller diameter than the inner diameter of the passages 16 if they are circular whereby the damping means is movable with respect to the buckets 11.

If the dual buckets 11—11 tend to deflect or vibrate during rotation of the rotor 10, the energy resulting therefrom is absorbed by the frictional force developed between the trunnions 22 and the walls of the passage 16 due to the centrifugal force from rotation of the rotor 10. It will be observed that the member 21 is able to move radially outwardly since the trunnions 22 are dimensionally smaller than the inner dimension of the passage 16 to fit loosely therein. Thus, it will be seen that the present invention provides an improved arrangement for damping the vibration of the turbine buckets and reduces the number of turbine bucket failures by decreasing the vibrational stress imposed on the buckets by operating conditions.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

We claim:

1. In combination, a rotor, a plurality of dual buckets mounted on the rotor, each of the dual buckets comprising a pair of buckets having shank portions and blade portions, each of the shank portions having a recess, the recesses of the shank portions of adjacent dual buckets cooperating to form a pocket therebetween, the shank portions of each of the dual buckets having a lateral passage extending therethrough, and means loosely supported in the passages of adjacent dual buckets and disposed within the cooperating pocket therebetween to dampen the vibrations of the adjacent dual buckets.

2. In combination, a rotor, a plurality of dual buckets mounted on the rotor, each of the dual buckets comprising a pair of buckets having shank portions and blade portions, the shank portion of each of the dual buckets having a lateral passage extending therethrough, each of the shank portions having a recess, the recesses of the shank portions of adjacent dual buckets cooperating to form a pocket therebetween, and a member of substantial mass having trunnions extending therefrom, the trunnions being of smaller diameter than the remainder of the member and being loosely disposed in the passages of the shank portions of adjacent dual buckets to support the member in the pocket therebetween to dampen the vibrations of the adjacent dual buckets.

References Cited in the file of this patent

UNITED STATES PATENTS

| 2,141,401 | Martinka | Dec. 27, 1938 |
| 2,310,412 | Flanders | Feb. 9, 1943 |
| 2,660,400 | Griffith | Nov. 24, 1953 |

FOREIGN PATENTS

| 15,893 | Great Britain | 1908 |
| 555,135 | Great Britain | Aug. 5, 1943 |
| 670,665 | Great Britain | Apr. 23, 1952 |
| 919,855 | Germany | Nov. 4, 1954 |
| 1,009,096 | France | Feb. 27, 1952 |